United States Patent [19]

Cousino

[11] 4,107,906
[45] Aug. 22, 1978

[54] IMPACT ACTUATED LAWN MOWER

[76] Inventor: Walter F. Cousino, 4830 W. Bancroft, St. Toledo, Ohio 43615

[21] Appl. No.: 769,206

[22] Filed: Feb. 16, 1977

[51] Int. Cl.² .............................................. A01D 55/00
[52] U.S. Cl. ...................................... 56/246; 56/17.6; 56/293
[58] Field of Search ........................ 56/246, 17.6, 293

[56] References Cited

U.S. PATENT DOCUMENTS

| | | | |
|---|---|---|---|
| 1,604,726 | 10/1926 | Stauter | 56/293 |
| 3,802,171 | 4/1974 | Cousino | 56/13.4 |
| 3,973,378 | 8/1976 | Bartasevich et al. | 56/246 X |

Primary Examiner—Russell R. Kinsey
Assistant Examiner—Daniel J. Leach
Attorney, Agent, or Firm—Wilbur A. Schaich

[57] ABSTRACT

The invention relates to an improvement in a reciprocating mower of the type wherein pivotal reciprocation of the cutting blades is produced by impact blows received from a rotary impactor. In accordance with this invention, two actuating levers are employed to transmit impact forces from a rotary impactor to the movable blades of the mower; one such lever moves the blades in one direction and the other lever effects the return movement of the movable blades. The rotary impactor successively contacts the two levers so that the resulting movements of the cutting blade is a movement in one direction followed by a dwell period, then a movement in the opposite direction followed by a dwell period. A fan, driven by the same prime mover as utilized to drive the rotary impactor, generates air currents which pick up and straighten the grass or other vegetation to be cut by the reciprocating blades and directs the cut vegetation through the plenum chamber of the fan and outwardly through a discharge chute.

4 Claims, 6 Drawing Figures

IMPACT ACTUATED LAWN MOWER

BACKGROUND OF THE INVENTION

This application constitutes an improvement of an impact actuated reciprocating mower of the type disclosed in my prior U.S. Pat. Nos. 3,657,868 and 3,802,171. In these prior patents, a rotary impactor was employed to linearly reciprocate two elongated cutting bars relative to each other, each bar carrying a plurality of cutting teeth. A spring was utilized to return the cutting bars to an open or aligned position of the cutting teeth in between the successive impacts.

Experimentation with these constructions revealed the fact that the cutting action of the blades was not as consistent or as powerful as desired, and it was determined that this was primarily due to the inertia effects of the relatively large mass of the elongated blades, coupled with the fact that the impact forces were always operating against the returning force of the spring.

Additionally, the elongated cutting bars were expensive to manufacture, difficult to sharpen, and required precise alignment when assembled on the mower.

In recent years, the Black & Decker Company, of Towson, Maryland, has marketed a hand-held trimming device for grass or hedges wherein the cutting blade assembly comprises two forklike members which are disposed in overlying relationship and mutually riveted together. The one forklike member is fixed to the frame of the device, while the other member is rapidly pivotally reciprocated relative to the fixed forklike member to provide a scissorlike cutting action between the tines of the forklike members, which have sharpened edges which cooperate with each other to effect the cutting action. These forklike members are inexpensively manufactured from stampings and are purchasable as completely assembled units at a price which is so reasonable as to cause the average householder to throw away any unit that has become dull or damaged and replace it with a new factory-assembled unit. The desirability of utilizing these types of cutting elements in a full-size lawn mower is readily apparent.

SUMMARY OF THE INVENTION

In accordance with this invention, a plurality of individual cutting elements are employed, having fork-shaped, scissor-acting blades, which are disposed in aligned relationship along the front of a lawn mower, with one blade of each of the forked scissors cutting elements being detachably secured to the bottom plate of the mower housing. The other forks of the scissorlike cutting elements are concurrently actuated by a reciprocating bar. The bar in turn is reciprocated respectively in opposite directions by two actuating levers, each of which has one end pivoted to a medial portion of the actuating bar and the other end pivoted to a rear portion of the mower bottom plate so that the actuating levers are generally disposed in the same plane and in parallel relationship. An impact actuating wheel is provided intermediate the actuating levers and carries a plurality of impact rollers on its periphery which successively make impact contacts with the medial portions of the actuating levers during each rotation of the impact wheel. The circumferential position of the impact rollers is selected so that each actuating lever is independently and separately contacted by an impact roller and there is no concurrent impacting of the levers by the rollers at any point in the rotation of the impact wheel. The result is that a high speed reciprocation of the movable blades is produced, with motion in one direction being followed by a dwell period, followed by motion in the opposite direction, followed by a dwell period, etc. The permissible stroke is limited to a multiple of the spacing of the fork tines, thus the blades are held in an open position for a substantial period of time at the end of each stroke sufficient to permit the uncut grass to enter the spaces between the tines as the mower is advanced across the lawn and, at the same time, the cutting stroke of the movable blades in either direction is very rapid, precise and unimpaired by any spring tending to oppose such motion in order to return the blades to an open position. With the forked construction of the cutting blades, cutting is accomplished during both strokes of the movable blades.

OBJECTS OF THE INVENTION

Accordingly, it is the object of this invention to provide an improved impact actuated reciprocating mower construction. A particular object of this invention is to provide an impact actuated mower construction employing a plurality of detachable scissor-type cutting blade units arranged in aligned relationship across the front edge of the mower and to actuate the movable blade of each cutting element by an impact blow in both the cutting and the return direction.

A further object of this invention is to provide an impact actuated, reciprocating blade mower construction wherein air currents are induced by a novel fan construction driven by the same motor means as the reciprocating blades so as to effect a pull-up action on the grass being cut and to remove the cut vegetation from the reciprocating cutting blades and prevent clogging the said blades by vegetation.

Further objects and advantages of this invention will be apparent from the following description and in the annexed sheets of drawings.

DESCRIPTION OF DRAWINGS

FIG. 5 is an enlarged scale perspective view of one of the reciprocating scissorlike, fork-shaped cutting elements employed in the mower.

FIG. 6 is a partial vertical sectional view taken on the plane 6—6 of FIG. 5.

DESCRIPTION OF THE INVENTION

Figure 1:
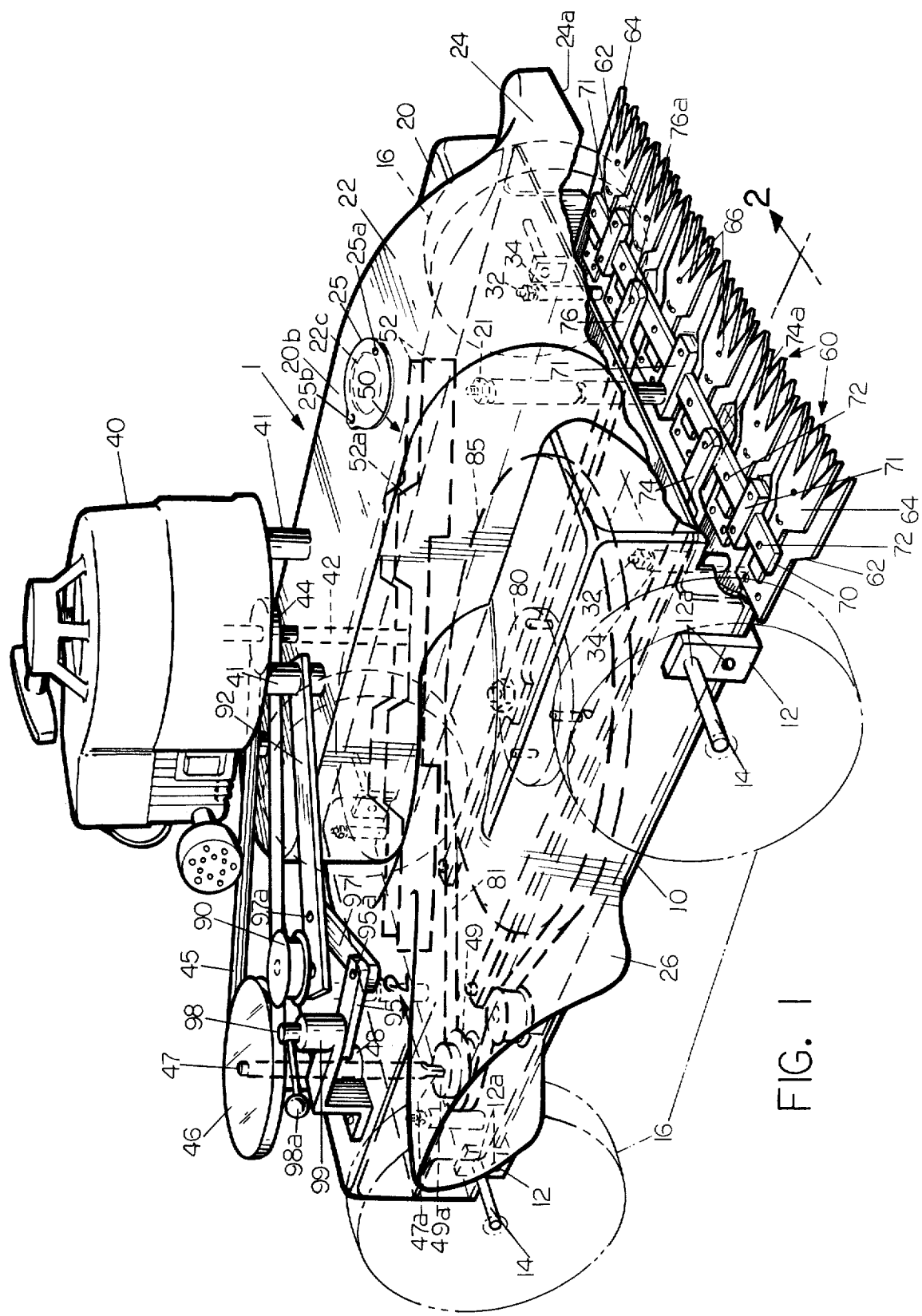
FIG. 1 is a perspective view, with portions broken away for clarity of illustration, of an impact actuated, reciprocating mower embodying this invention.

Referring to FIG. 1, a lawn mower 1 embodying this invention comprises a base plate 10, to which L-shaped brackets 12 are rigidly secured adjacent the four corners of the rectangular base plate. Stub shaft axles 14 are provided for selective mounting in one of a plurality of vertically spaced holes 12a provided in the vertical legs of the brackets 12. Wheels 16 are respectively mounted on the axle bolts 14 to carry the mower over the ground surface.

A bulbous shaped main housing 20 is provided which may be formed from metal or a suitable plastic material. Housing 20 is of generally rectangular configuration and has its bottom open end shaped to conform to the perimeter of the rectangular plate 10. A number of upstanding bolts 21 are provided near the front and rear ends of the housing 20 to secure housing 20 to the bottom plate 10.

An intermediate barrier plate 30 (FIG. 2) is provided which fits snugly within the confines of main housing 20 and is supported in parallel relationship above the bottom plate 10 by a plurality of bolts 32 and spacer sleeves 34. As will be later described, the barrier plate 30 is apertured to provide passage for a shaft 47 of the drive mechanism for the mower, but it also cooperates with the bulbous shaped top portion of the housing 20 to define the bottom of a plenum chamber 20a (FIG. 2) for a fan.

A fan inlet housing 22 is suitably rigidly secured to the top surface of main housing 20. On its top surface 20b a prime mover 40 is mounted by legs 41 and suitable bolts (not shown) and may comprise either an electric or gasoline powered engine having a depending output shaft 42. Shaft 42 mounts a drive pulley 44 immediately below the engine 40 and also projects through the top wall 20b of fan housing 22 into the plenum chamber 20a and has a fan blade 50 of unique configuration secured to its bottom end by a suitable nut 51.

Along the forward edge of the bottom plate 10, a plurality of scissor-like cutting units 60 are mounted in side-by-side aligned relationship. As best shown in FIGS. 5 and 6, each cutting element comprises a pair of fork-shaped members 62 and 64 which are pivotally secured together at their medial portions by a rivet 66. The tines 64a and 62a of the fork-shaped members have their edges sharpened so that when one fork is reciprocated with respect to the other, a cutting action is produced between the tines 62a and 64a of the fork-shaped members 62 and 64.

The relative reciprocating movement between the fork-shaped members 62 and 64 is reduced in friction by a roller bearing 67 which is mounted in a slot 64b and rolls in an arcuate depressed groove 62b formed in the fork-shaped members 64 and 62 respectively. The groove 62b and slot 64b are respectively formed on a radius about the pivot axis provided by rivet 66, and the extremities of such groove also limit the extremity of relative motion of the forks 62 and 64. The motion limitation is preferably equal to the distance between either one or two of the adjacent fork tines so that, in either extreme position of relative reciprocation, the tines 62a and 64a are in alignment and the spaces between them are open to receive grass for the cutting action of the next stroke of the fork-shaped members.

The cutting elements 60 are each detachably secured to the forward edge of the bottom plate 10 by a pair of screws 61 which traverse the rear edge of the bottom fork 62 and thus any individual cutting unit may be readily removed from the assembly and replaced by a new unit in the event that the cutting edges of a particular unit are damaged or become dull.

Cutting elements 60 are concurrently actuated by a bar 70 which overlies the rear ends of the top forks 64 and is retained in position by straps 71 bolted to base plate 10. The bar 70 is provided with a plurality of depending pins 72 which respectively engage elongated slots 64c provided in each of the top cutting elements 64. Thus, a horizontal reciprocating motion imparted to the bar 70 produces a scissorlike reciprocation of the top fork-shaped elements 64 relative to the bottom fork-shaped cutting elements 62.

The actuating bar 70 is in turn driven by a pair of actuating levers 74 and 76 (FIG. 3) which have their forward ends respectively pivotally secured to medial portions of the actuating bar 70 by pins 74a and 76a, and their rear ends respectively pivotally mounted to upstanding bolts 11a and 11b provided near the rear end of the bottom plate 10. The actuating levers 74 and 76 are thus disposed in generally parallel, spaced relationship and each actuating bar has an inwardly projecting abutment surface 74b and 76b respectively which are arranged to be sequentially engaged by an impact device.

The impact device comprises a wheel 80 which is mounted on a suitable vertical shaft 82 rotatably journaled in a bearing 84 provided on the top of base plate 10. Wheel 80 is provided with a plurality of depending impact rollers 86 (FIG. 3) disposed on suitable pins 85a in spaced arrangement around its periphery. The radial spacing of rollers 86 is such that the rollers successively impact the actuating levers 74 and 76 but never concurrently impact such levers.

Figure 3:
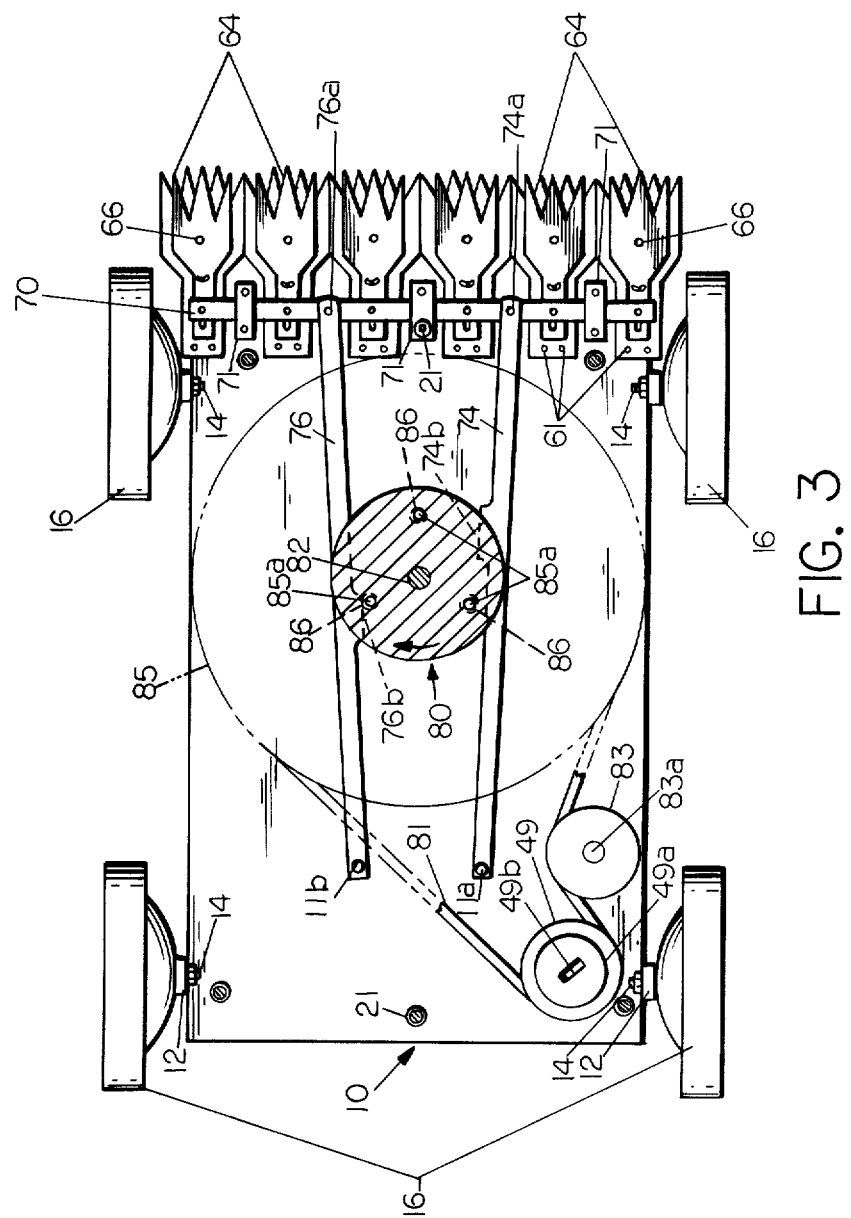
FIG. 3 is a horizontal sectional view taken on the plane 3—3 of FIG. 2.
Figure 4:
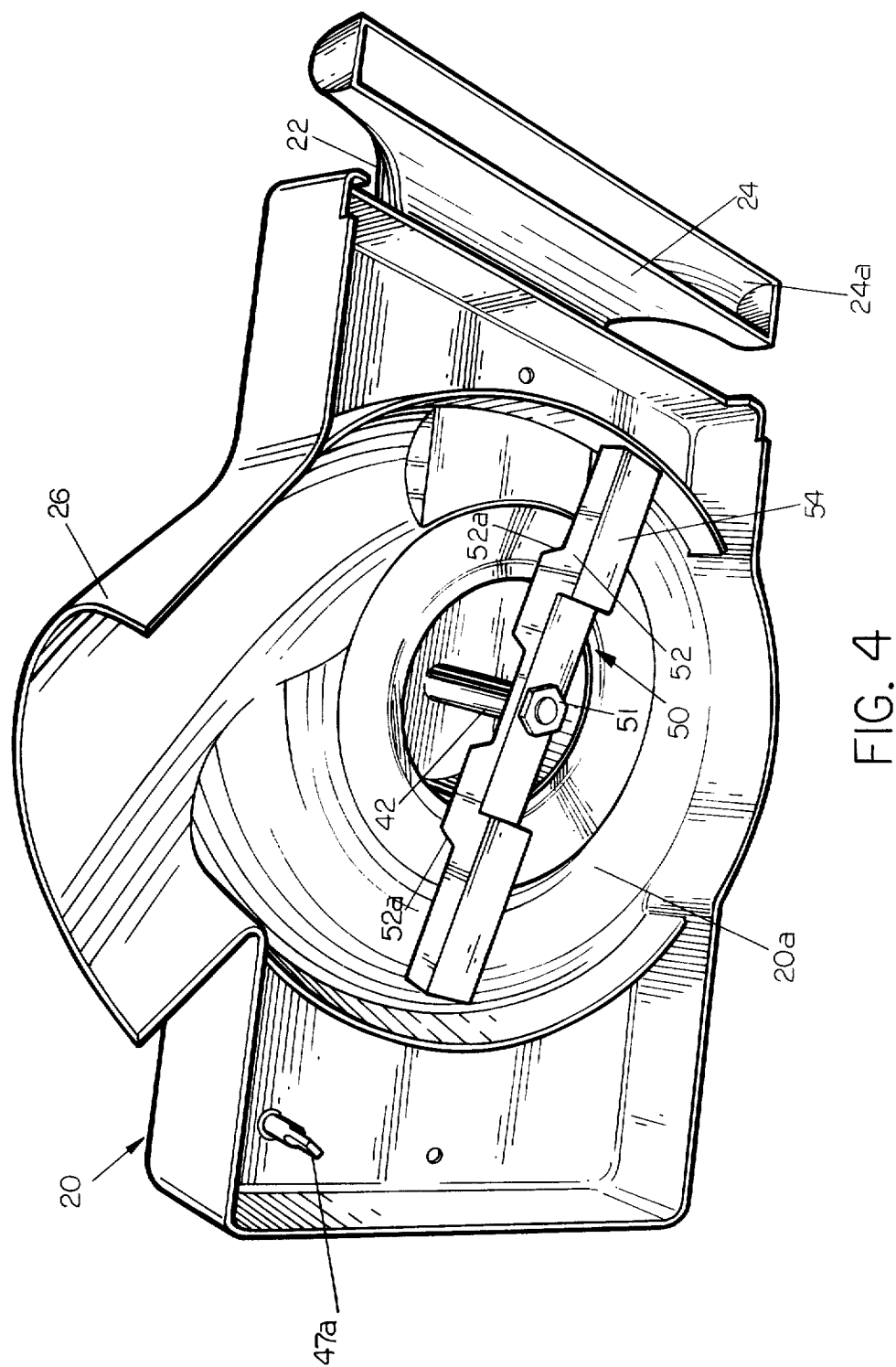
FIG. 4 is a bottom perspective view of the mower housing with the bottom plate removed therefrom, showing the construction of the fan and the plenum chamber.

Thus the actuating bar 70 is moved to its extreme left-hand position, as viewed in FIG. 3, by the impact of a roller 86 with the abutment surface 74b of actuating lever 74 and then is moved to its extreme right-hand position, as viewed in FIG. 3, by the impact of another roller 86 with the inwardly projecting abutment 76b of actuating lever 76. This reciprocation of the actuating bar 70 results in a scissorlike reciprocation of the fork-shaped cutting elements 60, but with a unique sequence of motions. Assuming that the fork-shaped members are in their one extreme position, then the tines are vertically aligned so that the space between the tines is completely free to receive grass therebetween. The stroke of the actuating bar 70 is proportioned to pivotally move the upper forks 64 a distance equivalent to once or twice the spacing between the tines. After such movement is accomplished, the tines 62a and 64a are again in an aligned open position. The forks then remain in that position until the other actuating lever is impacted by an impact roller 86 and then they are moved through an equal return stroke, where again they come to rest for a dwell period with the tines 62a and 64a in an open aligned position. The impact wheel 80 is driven by being pinned to a large pulley sheave 85 which is also mounted on the vertical shaft 82. To drive the sheave 85, a belt drive train is provided from the driving pulley 44 of the engine 40. This drive train comprises a first belt 45 connecting the drive pulley 44 with a first intermediate pulley 46 which is mounted on a vertical shaft 47 which projects downwardly through an appropriate bearing 48 provided on the top surface of the mower housing 20. The lower end of shaft 47 also projects through an appropriate aligned aperture (not shown) in the intermediate plate 30 and is of noncircular configuration, as indicated at 47a. This provides a vertically detachable driving connection with a non-circular aperture 49b in a hub 49a of a second intermediate pulley 49 which is journaled in an appropriate bearing (not shown) provided on the bottom plate 10 and has a sheave portion for receiving a belt 81 which drives the sheave 85 of the impact wheel assembly 80. An idler roller 83 (FIG. 3), rotatably mounted on a vertical stub shaft 83a secured to the bottom plate 10 insures the non-slipping engagement of the belt 81 with the pulley 49. The non-rectangular sliding connection between the bottom end 47a of pulley shaft 47 and the hub 49a of the second intermediate pulley 49 permits the drive train to be readily disengaged whenever the mower housing 20 is lifted vertically with respect to the base plate 10 for disassembly purposes.

The belt 45 which connects the motor driven pulley 44 with the first intermediate pulley 46 is normally larger than required by the distance between such pulleys and their respective diameters, and the slack in such belt is taken up by a manually actuated clutching pulley 90 (FIG. 1) which is mounted on the free end of a horizontal bar 92 which is pivoted to one of the engine support legs 41. The bar 92 and pulley 90 may be manually shifted from a loose belt position relative to the belt 45 to a belt tightening position by a manually activated toggle linkage, comprising an actuating shaft 98 journaled in an appropriate bracket 99 secured to the top surface 20b of the housing 20 and angularly shiftable by a manually engagable handle 98a. The oscillating movements of the vertical shaft 98 are transmitted into horizontal movements of the support bar 92 by a pair of links 95 and 97. Link 95 is keyed to shaft 98 and pivotally connected to one end of the link 97 by a pin 95a, while the other end of link 97 is pivotally connected to an intermediate portion of the pulley support bar 92 by a pin 97a.

Because of the speed reduction involved due to the difference in diameters of drive pulley 44 and first intermediate pulley 46, and between second intermediate pulley 49 and the sheave 85 of the impact wheel assembly 80, it is apparent that the impact wheel rotates at substantially less rpm than does the fan blade 50 so that the fan blade 50 can rotate at a substantial speed without causing an excessive speed of reciprocation to be applied to the movable cutting fork elements 64.

The fan blade 50 is of unusual configuration which can be best described as being channel-shaped, having identically shaped sidewalls 52 folded up from a bottom wall 54. Intermediate the ends of the sidewalls 52 and the motor drive shaft 42, the sidewalls 52 and bottom wall are increased in height as at 52a. The purpose of this configuration is to provide an upward thrust to all grass cuttings entrained in the air stream entering the plenum chamber 20a so that such cuttings are essentially discharged without dropping into the bottom of the plenum chamber 20a and creating the possibility of accumulating and clogging.

The previously mentioned air inlet housing 22 has its forward end 24 shaped like the nozzle of a conventional vacuum cleaner, the open mouth 24a of which overlies the cutting forks 64 at a point just rearwardly of their tines 64a. In this manner, the air inlet housing 22 does not contact the grass to be cut until after it has been engaged by the cutting forks 62 and 64 and the cut vegetation is sucked up into the inlet housing 22 through mouth 24a by the suction stream of air created by the high speed rotation of fan blade 50. The fan inlet housing 22 defines an air passageway 22b, best shown in FIG. 2, which directs the inlet air adjacent to the central portions of the trough-shaped fan blade 50, at which point the air is accelerated both in an upward and an outward direction, to be discharged through a discharge chute.

At a point roughly 270° around the perimeter of the plenum chamber 20a, an integral or separately formed air discharge housing 26 is provided through which the air stream generated by the fan blade 50 is discharged from plenum chamber 20a in a direction generally rearwardly and sidewardly relative to the forward progress of the mower. The discharge housing 26 may be connected to a porous collecting bag if collection of the cut vegetation is desired, but this is a conventional arrangement and will not be described in detail.

Obviously the unit may be utilized for leaf pick-up by removing the detachable cutting fork units 60. Any damaged or dull unit 60 may be removed and repaired or replaced by the operator.

Figure 2:
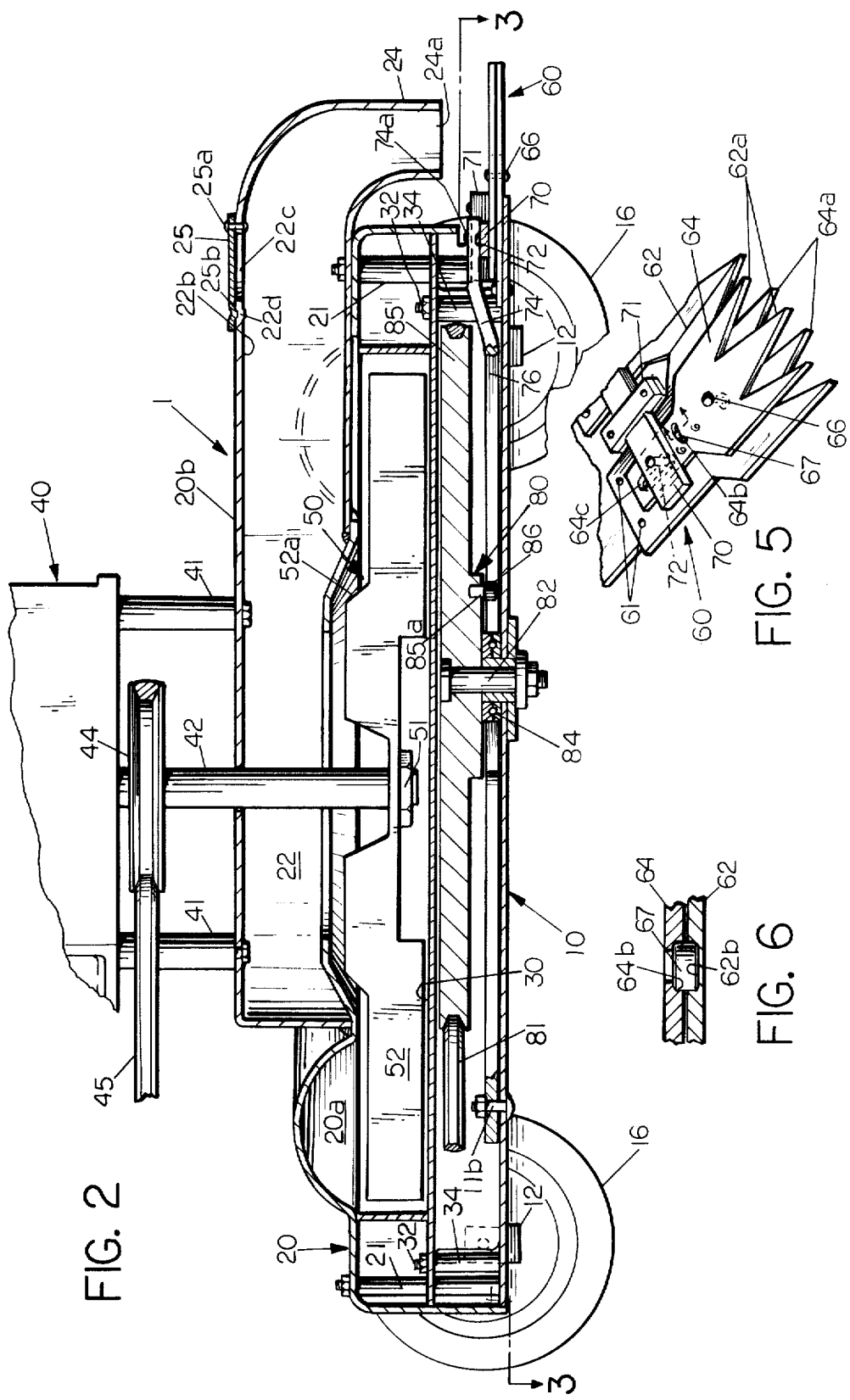
FIG. 2 is a vertical sectional view taken on the plane 2—2 of FIG. 1.

As best shown in FIG. 2, an access opening 22c is provided in the top wall of fan inlet housing 22 to permit fastening or unfastening of the nut on bolt 21. Opening 22c is normally closed by a cover 25 which is pivoted to fan inlet housing 22 by a pin 25a and detachably secured in closed position by a dimple depression 25b engaging a similar depression 22d in the fan inlet housing.

From the foregoing description, the operation of the mower embodying this invention should be readily apparent to those skilled in the art. As the mower is advanced along the ground, the reciprocating fork-shaped cutting members 62 and 64 cooperate to cut all vegetation that enters the spaces between the tines 62a and 64a. There is ample opportunity for the vegetation to enter such spaces because of the unique movement cycle imparted to such tines by the impact actuated driving mechanism. The fact that the tines are in their opened position at the end of each stroke, and remain in that opened position for a significant period of time, insures that the vegetation to be cut will readily enter the spaces between the tines. The air stream generated by the fan blade 50 immediately sucks up the cuttings and directs them through the fan inlet housing 22 into the plenum chamber 20a and then discharges the cuttings outwardly through the discharge housing 26 so that the cuttings are dispersed over a wide area adjacent to the mower, or may be collected in an appropriate porous bag secured in conventional fashion to the end of the discharge housing 26.

Modifications of this construction will be apparent to those skilled in the art, and it is intended to include all such modifications within the scope of the appended claims.

I claim:

1. An impact actuated lawn mower having a wheel mounted base plate, comprising a plurality of individual pairs of pre-sharpened, permanently assembled scissor-like forked blades secured in overlying pivoted relationship by a rivet, said pairs being arranged in side-by-side aligned relationship across the forward edge of said base plate, one blade of each pair being detachably secured to the forward edge of said base plate, the other blade of each pair of blades being pivotally, reciprocatingly movable across the one blade to produce a cutting action, an actuating bar disposed generally parallel to the alignment of said pairs of scissor-like blades, overlying said blades, and having a pin and slot connection with each of said movable blades, whereby longitudinal reciprocation of said bar effects concurrent reciprocation of all of said movable blades, a first force transmitting lever disposed generally perpendicular to said actuating bar and having one end thereof pivotally connected to said bar and the other end thereof pivotally connected to a rear portion of said base plate, a second impact lever disposed in laterally spaced, parallel relationship to said first force transmitting lever, said second lever having one end thereof pivotally connected to said actuating bar and the other end thereof pivotally connected to the rear portion of the base plate, an impact wheel lying between and in the same plane as said levers, and mounted on said base plate for rotation about an axis perpendicular to said plane, said impact wheel carrying at least one impact roller on its periphery, each of said levers having a medial portion thereof constructed and arranged to be momentarily impacted by said impact roller carried by said impact wheel during each rotation of said impact wheel, whereby said actuating levers are respectively repeatedly successively impacted by said roller in opposite directions, and means for rotating said impact wheel at relatively high speeds to cause rapidly repeated impacts with said levers to in turn impart rapid intermittent reciprocating movements to said actuating bar, thereby producing rapid intermittent reciprocating movement of said movable blades, with a dwell period of substantial duration interposed between each successive movement of the movable blades.

2. The combination defined in claim 1, wherein two or more of said impact rollers are mounted on the periphery of said impact wheel and disposed to successively engage both said first impact lever and said second impact lever, said rollers being radially spaced so that only one of said rollers can engage one of said levers at a time and the particular lever is caused to move to its extreme position by the impact force imparted before the opposite lever is impacted by the next impact roller.

3. The combination defined in claim 1, plus a housing mounted above said plate and having the general configuration of an inverted box with said plate forming the bottom of said box, a dividing plate disposed vertically above said mounting plate and cooperating with the top wall of said housing to define a plenum chamber, a rotary fan blade mounted in said plenum chamber and arranged to be driven by the downwardly projecting shaft of a prime mover supported on the top wall of said housing, air conduit means having an inlet opening disposed immediately above said aligned array of scissorlike cutting elements, and communicating with said plenum chamber, whereby grass cut by said cutting elements is drawn into the plenum chamber by the inlet air currents generated by rotation of said fan blade, and a radially disposed air outlet conduit means communicating with said plenum chamber for discharge of the generated air stream and entrained grass clippings.

4. The combination defined in claim 3, plus speed reducing means interposed between said prime mover and said impact wheel to rotate said wheel at a fraction of the speed of said fan blade, thereby permitting optimum generation of the grass clipping removing air stream without reducing the speed of reciprocation of said scissor-like cutting elements below an effective level.

* * * * *